Feb. 16, 1971 W. E. STINE 3,563,840

HONEYCOMB HAVING EQUAL SHEAR STRENGTH PROPERTIES

Filed June 13, 1968

INVENTOR.
WALTER H. STINE
BY
*Oldham & Oldham*
ATTORNEYS

United States Patent Office 3,563,840
Patented Feb. 16, 1971

3,563,840
HONEYCOMB HAVING EQUAL SHEAR STRENGTH PROPERTIES
Walter E. Stine, North Olmstead, Ohio, assignor to Morgan Adhesives Company, Stow, Ohio, a corporation of Ohio
Filed June 13, 1968, Ser. No. 736,639
Int. Cl. B32b 3/12
U.S. Cl. 161—68                        1 Claim

ABSTRACT OF THE DISCLOSURE

This invention modifies the conventional hexagonal honeycomb core design by changing the lengths of the sides and the angles within the hexagonal cores themselves so as to provide a honeycomb having the same shear strength characteristics in the ribbon direction as the normal direction, and with an accompanying reduction in weight of the honeycomb material.

---

Heretofore, the uses for honeycomb have been well known as a structural material. However, conventional honeycomb has some structural deficiencies such as having greater shear strength in the ribbon direction, than in the normal direction, which results in greater overall weight than is sometimes necessary to accomplish the structural purpose of the material.

Therefore, it is the general object of the present invention to avoid and overcome the foregoing and other difficulties of the prior art practices by providing a honeycomb core laminate utilizing a core construction which provides a reduced weight honeycomb having the same shear strength in the ribbon direction as in the normal direction.

The aforesaid object of the invention and other objects which will become apparent as the description proceeds are achieved by providing a high strength sandwich structure comprising a pair of surface sheets, a low density, cellular honeycomb core interposed between the surface sheets with the direction of the cells extending normal to the surface sheets, whereby the edges of the cells are opposite the inner surfaces of the surface sheets, and means for bonding the edges of the cellular honeycomb core structure to the respective surface sheet which is characterized by the honeycomb core being made up of a plurality of substantially straight, adjacent ribbons secured together along appropriate lengths with the ribbons then expanded in a directional normal to the ribbon direction to produce a hexagonal-shaped honeycomb core wherein the secured portions of the ribbon are of equal lengths and substantially parallel to the ribbon direction, the free portions of the ribbon being of equal length, but longer than the secured portions whereby the length of the free portions is related to the length of the secured portions to give the core substantially the same shear strength in the ribbon direction as the normal direction.

For a better understanding of the invention, reference should be had to the accompanying drawings wherein.

Figure 1:
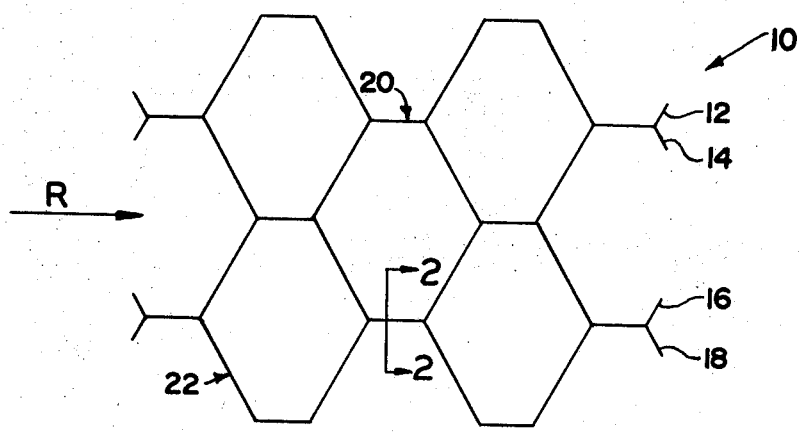
FIG. 1 is a plan schematic illustration of three ribbons properly secured and formed to the honeycomb core shape comprising the preferred embodiment of the invention.

With reference to the form of the invention illustrated in FIG. 1 of the drawings, the numeral 10 illustrates generally a honeycomb core configuration made from four ribbons, 12, 14, 16, and 18, respectively, which are secured along certain portions so when the ribbons are expanded to the position shown in FIG. 1, the hexagonal honeycomb pattern takes shape. Any conventional technique to secure the ribbons together can be utilized, such as welding, or suitable adhesive. The critical aspect of the invention resides in the secured portions, indicated generally by numeral 20, being substantially parallel to the ribbon direction indicated by arrow R, and also being much shorter than the unsecured portions indicated generally by numeral 22.

Figure 2:
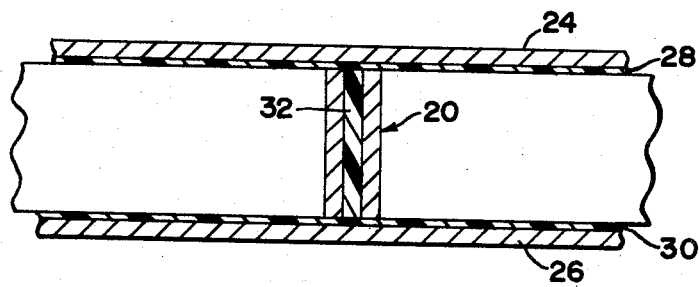
FIG. 2 is a side elevation cross-sectional view of the embodiment of FIG. 1.

FIG. 2 illustrates the core of FIG. 1 in cross-sectional relationship as it is interposed between skins 24 and 26, respectively, and also showing suitable adherence between the core 10, and the skins 24 and 26 by adhesive layers 28 and 30, respectively. Also, FIG. 2 illustrates an adhesive layer 32 bonding the ribbons together along the secured portion 20. It should be understood that the illustration of FIG. 2 is considerably exaggerated in size, as is the relationship between the ribbon and adhesive layers. For example, preferably the ribbon will be approximately .002 inch in thickness with the adhesive layer being less than .001, and nearer 0.0005 inch in thickness, all of which characteristics are conventional to the honeycomb field. Also, of course, it should be understood that the fabrication of the honeycomb hore could be from metal or some other suitable structural material that will adequately meet the specifications for use, again as is well known in the art. The illustration of FIG. 2 shows the honeycomb core and sheets being made from metal.

Figure 3:
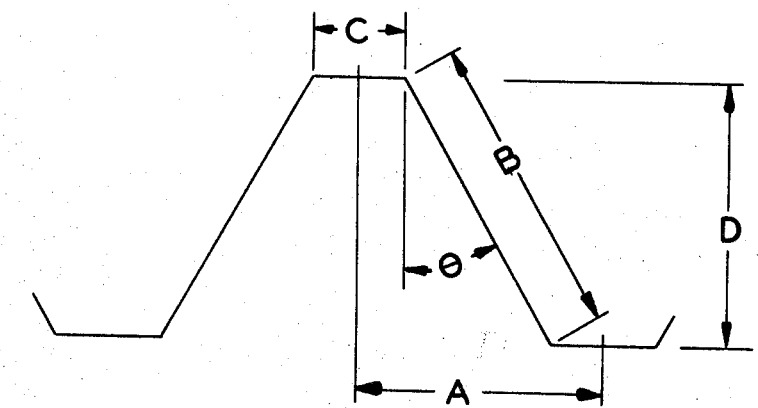
FIG. 3 is a schematic illustration representing the length of the sides and the angular relationship therebetween which are utilized to determine the specific structural requirements of the core.

FIG. 3 illustrates the critical relationships in the formulation of the hexagonal shape shown in FIG. 1, and these are illustrated as distances A, B, C, and D, and angle Θ. The most desirable relationship between these distances and angles is listed below as follows:

Material thickness—0.002 inch
A—0.0865 inch
B—0.100 inch
C—0.0364 inch
Θ—30°
Ribbon and normal shear strength—426 p.s.i.
Weight savings—15.3%

It appears that reasonable deviations from this relationship on both sides are possible to still obtain the advantages of the invention, namely, to have shear strength in both the ribbon and normal direction be substantially equal, and to obtain a maximum weight savings at the same time. Naturally, the critical aspect of the invention is the relationship between the lengths B and C, as these lenghs control lengths A and D. For the purposes of the invention, it is quite important that the lengths A and D be very nearly equal, thus retaining most of the compressive strength characteristics of honeycomb structure. Hence, for the purposes of the invention, it is believed critical that the lengths A and D be within 10% of being equal to each other, and that the relationship between lengths B and C be at least 1.5 to 1, but not greater than 4 to 1, with the preferable relationship being 2.75 to 1. Naturally, the angle Θ depends upon the lengths, and the preferable angle is 30° on the 2.75 to 1 relationship.

The invention is concerned with making a hexagonal honeycomb laminate core where the length of the sides and the angles of the hexagon controls the shear strength of the composite. The length of the sides of the hexagon running somewhat in the normal direction in comparison with the sides of the hexagon running in the ribbon direction achieves the degree of shear strength desired.

While in accordance with the patent statutes only one best known embodiment of the invention has been illustrated and described in detail, it is to be particularly understood that the invention is not limited thereto or

What is claimed is:

1. A high strength sandwich structure comprising a pair of surface sheets, a low density cellular honeycomb core interposed between said surface sheets with the axial direction of the cells extending normal to the surface sheets, whereby the edges of the cells are opposite the inner surfaces of the surface sheet, and means for bonding the edges of said honeycomb core structure to the respective surface sheet, which is characterized by:

the honeycomb core comprising a plurality of ribbons extending parallel to one another, each ribbon having a plurality of first bonding portions on one side thereof, bonding portions on the opposite side thereof and of the same length as said first bonding portions, free portions between adjacent first and second bonding portions, said free portions being of equal length to one another but longer than the bonding portions, said bonding portions defining spaced, parallel planes extending parallel to the ribbon direction, said ribbons being oriented in side-by-side relation, the first bonding portion of each ribbon being bonded to the second bonding portion of the adjacent ribbon, said core having substantially the same shear strength in the ribbon direction as in the normal direction; and the free portions of the ribbon are 2.75 times as long as the secured portions, and where the length from the center of each hexagonal shape to the center of each secured portion defining such hexagonal shape is substantially the same distance.

References Cited

UNITED STATES PATENTS 2,609,068   9/1952   Pajak _____ 161—68
2,828,235   3/1958   Holland et al. _____ 161—68

JOHN T. GOOLKASIAN, Primary Examiner

H. F. EPSTEIN, Assistant Examiner